United States Patent [19]

Hölter et al.

[11] Patent Number: 4,670,234

[45] Date of Patent: Jun. 2, 1987

[54] PROCESS FOR STRIPPING NITROGEN OXIDES AND SULPHUR OXIDES AS WELL AS OPTIONALLY OTHER NOXIOUS ELEMENTS OF FLUE GAS FROM COMBUSTION PLANTS

[75] Inventors: Heinz Hölter, Beisenstr. 39-41, 4390 Gladbeck; Heinrich Igelbüscher, Gladbeck; Heinrich Gresch, Dortmund-Wickede; Heribert Dewert, Gladbeck, all of Fed. Rep. of Germany

[73] Assignee: Heinz Holter, Gladbeck, Fed. Rep. of Germany

[21] Appl. No.: 781,235

[22] PCT Filed: Jan. 23, 1985

[86] PCT No.: PCT/EP85/00018

§ 371 Date: Sep. 24, 1985

§ 102(e) Date: Sep. 24, 1985

[87] PCT Pub. No.: WO85/03238

PCT Pub. Date: Aug. 1, 1985

[30] Foreign Application Priority Data

| | | |
|---|---|---|
| Jan. 25, 1984 | [DE] Fed. Rep. of Germany | 3402383 |
| Mar. 15, 1984 | [DE] Fed. Rep. of Germany | 3409526 |
| Apr. 17, 1984 | [DE] Fed. Rep. of Germany | 3414471 |
| Apr. 21, 1984 | [DE] Fed. Rep. of Germany | 3415150 |
| May 25, 1984 | [DE] Fed. Rep. of Germany | 3419611 |
| Jun. 20, 1984 | [DE] Fed. Rep. of Germany | 3422780 |
| Jul. 26, 1984 | [DE] Fed. Rep. of Germany | 3427550 |
| Jul. 30, 1984 | [DE] Fed. Rep. of Germany | 3428108 |
| Aug. 11, 1984 | [DE] Fed. Rep. of Germany | 3429663 |
| Aug. 16, 1984 | [DE] Fed. Rep. of Germany | 3430017 |
| Nov. 8, 1984 | [DE] Fed. Rep. of Germany | 3440782 |
| Nov. 13, 1984 | [DE] Fed. Rep. of Germany | 3441340 |
| Nov. 13, 1984 | [DE] Fed. Rep. of Germany | 3441339 |
| Dec. 12, 1984 | [DE] Fed. Rep. of Germany | 3445203 |
| Dec. 24, 1984 | [DE] Fed. Rep. of Germany | 3447425 |
| Dec. 27, 1984 | [DE] Fed. Rep. of Germany | 3447494 |
| Dec. 27, 1984 | [DE] Fed. Rep. of Germany | 3447519 |

[51] Int. Cl.$^4$ .................. C01B 21/00; C01B 17/00

[52] U.S. Cl. .................. 423/235; 423/242; 423/243

[58] Field of Search .............. 423/235, 242 A, 242 R, 423/243

[56] References Cited

U.S. PATENT DOCUMENTS

| | | | |
|---|---|---|---|
| 3,923,954 | 12/1975 | Petrey et al. | 423/243 |
| 3,932,585 | 1/1976 | Moriguchi et al. | 423/235 |
| 3,971,734 | 7/1976 | Bush | 423/235 |
| 4,222,993 | 9/1980 | Holter et al. | 423/243 |

FOREIGN PATENT DOCUMENTS

| | | | |
|---|---|---|---|
| 50-67776 | 6/1975 | Japan | 423/235 |
| 50-139066 | 6/1975 | Japan | 423/235 |
| 51-14873 | 5/1976 | Japan | 423/235 |
| 51-87472 | 7/1976 | Japan | 423/235 |
| 52-13787 | 4/1977 | Japan | 423/235 |
| 53-39264 | 11/1978 | Japan | 423/235 |

*Primary Examiner*—Gregory A. Heller
*Attorney, Agent, or Firm*—Karl F. Ross; Herbert Dubno

[57] ABSTRACT

Process for stripping nitrogen oxides and sulphur oxides, as well as optionally other noxious elements from flue gas from combustion plants, preferably boilers of electric plants supplied with fossil fuels, the nitrogen oxides being reduced into elemental nitrogen and the sulphur oxides as well as other noxious elements being stripped by a washing process. In order to improve this process of the above-mentioned type as to the simplicity of its implementation and the possible results, the present invention proposes a series of measures such as the addition of a monobasic and/or multibasic carbonic acid to EDTA with limestone or the like, the addition of phosphonic acid or the salt thereof to the washing liquid up to an electrochemical process whereby are added to the washing liquid of a conventional desulphuration plant salts which form with the nitrogen monoxide complexes which are reduced into elementary nitrogen and water by mixing them with formic acid to prevent the precipitation of iron-III-hollow hydroxide at a potentiostatic cathode.

19 Claims, 12 Drawing Figures

PROCESS FOR STRIPPING NITROGEN OXIDES AND SULPHUR OXIDES AS WELL AS OPTIONALLY OTHER NOXIOUS ELEMENTS OF FLUE GAS FROM COMBUSTION PLANTS

CROSS REFERENCE TO RELATED APPLICATIONS

This application is a national phase applicator corresponding to the international application PCT/EP85/00018 filed Jan. 23, 1985 and based under the International Convention, in turn, on the following national applications:

P 34 02 383.6, Jan. 25, 1984
P 34 09 526.8, Mar. 15, 1984
P 34 14 471.4, Apr. 17, 1984
P 34 15 150.8, Apr. 21, 1984
P 34 19 611.0, May 25, 1984
P 34 22 780.6, June 20, 1984
P 34 27 550.9, July 26, 1984
P 34 28 108.8, July 30, 1984
P 34 29 663.8, Aug. 11, 1984
P 34 30 017.1, Aug. 16, 1984
P 34 40 782.0, Nov. 8, 1984
P 34 41 340.5, Nov. 13, 1984
P 34 41 339.1, Nov. 13, 1984
P 34 45 203.6, Dec. 12, 1984
P 34 47 425.0, Dec. 24, 1984
P 34 47 494.3, Dec. 27, 1984
P 34 47 519.2, Dec. 27, 1984

The present invention relates to a process for the removal of oxides of nitrogen and oxides of sulfur, as well as other injurious substances from the smoke and gases discharged from combustion plants, mainly from generating plant boilers that are charged with fossil fuels, the oxides of nitrogen being reduced to simple nitrogen and the oxides of sulfur and any other injurious substances being removed by means of a scrubbing process.

BACKGROUND OF THE INVENTION

When fossil fuels are burned oxides of nitrogen (NO and $NO_2$) result from thermal reaction of atmospheric nitrogen and atmospheric oxygen (thermal $NO_x$), from reaction of nitrogen from the fuel with atmospheric oxygen (fuel $NO_x$) and by conversion of compounds (radicals) that contain nitrogen with combustion air (prompt $NO_x$).

The contents of oxides of nitrogen vary according to the fuel that is involved and according to combustion conditions. Once liberated to the atmosphere, the nitrogen oxides are subject to further chemical conversion, particularly photochemical conversion, which can subsequently lead to the formation of organic peroxide compounds with the hydrocarbons that are also present, and which in turn are responsible for extensive plant damage.

Together with the oxides of sulfur ($SO_2$ and $So_3$) that result from the sulfur compound in the fuels, as well as the acids that result from these, the oxides of nitrogen and their secondary products that are formed in the atmosphere are regarded as the principal cause of air pollution and the damage that results from such pollution.

At present there is a paucity of knowledge about the precise causal mechanisms of many of the types of such damage.

Legal regulations as well as guidlines and instructions have been enacted in various industrial nations with the aim of reducing emissions of the oxides of sulfur and nitrogen.

Catalytic process for the removal of oxides of nitrogen are known; in these processes NO and $NO_2$ are reduced to simple nitrogen by reducing agents. In the combustion plants of power generating stations, for example, ammonia is used predominantly as the deoxidizing agent for oxides of nitrogen that are then converted to elementary nitrogen and water over various catalysts such as transition metal oxides, zeolites, activated charcoal, or activated coke.

Removal of sulfur oxides from the smoke gases is in many instances effected by contact with washing solutions that contain calcium ions that remove the oxides of sulfur, oxidized to sulfates, in the form of gypsum.

OBJECT OF THE INVENTION

It is the object of the present invention to improve the process of the type described in the introduction hereto with regard to its simplicity and the results that can be achieved.

SUMMARY OF THE INVENTION

According to the present invention this object is achieved in that ethylenediaminetetraacetic acid (EDTA) $C_{10}H_{16}O_8N_2$ and a mono- and/or multi-base carboxylic acid, preferably formic acid, together with limestone, fine chalk or derivatives thereof, are added to the scrubbing liquid of a desulfuration plant. It has been found that because of the reduction of the $SO_2$ and $NO_x$ components by the EDTA, the combined effect of both additives is more favorable, i.e. operates with a higher efficiency, and is more economical.

It is known that $NO_x$ can be removed from the smoke gas downstream of to a combustion plant by the addition of EDTA and iron-II sulfate and passing the gas to a desulfurization wash circulation system, it being necessary in such a case to maintain a special ratio of the $SO_2$ and the $NO_x$ (a minimum of 2:1) and a certain oxygen content of the smoke gas.

It has been found that the simultaneous separation of $NO_x$ can be greatly increased and the formerly known disruptive effects reduced or avoided in that the simultaneous $NO_x$ separation can be carried out as a separate scrubbing process together with the chloride or hydrochloric acid wash prior to a desulfurization system or between the HCl wash and the desulfurization.

The advantages lie in the fact that the $NO_x$ separation is carried out in a controllably acidic wash solution (pH 2.5-4.5) since: (a) the complex bound iron-II oxidizes with difficulty in this acid medium; (b) the NO-bond is maintained without any significant hindrance of the oxidation of the iron.

A further advantage is that the total quantity of $SO_2$ in the smoke gas is available for the NO-reduction since the quantity of chalk is first added to the desulfurization system and the bonding value of the EDTA cannot be used for calcium ions and is only available for the iron-II ion.

The scrubbing system can be so controlled by the adjustment of the pH value and wash-water vaporization that a maximum EDTA enrichment the EDTA achieved and can be recovered as a precipitate by lowering the pH value of the EDTA in the wash solution to a pH of 2.

Furthermore, it has been found that in place of the EDTA the potassium salt of the N-(2-carboxy-ethyl)-1-amino-ethane-1,1-diphosphonic acid and the potassium salt of the N,N-bis(carboxymethylene)-1-amino-ethane-1,1-diphosphonic acid can preferably be used, since these found phosphonic acids can bind complexly considerably more iron-II than EDTA.

It is known that polycarboxylic acids or phosphonic acids can be used in combination with iron-II sulfate for the simultaneous scrubbing of $NO_x$ in addition to $SO_2$, $SO_3$, HF, and HCl.

Washing can be carried out in a pre-wash together with the hydrohalic acids prior to the $SO_2$ wash, with the wash water at pH 2.5–4.5, or after the hydrohalic acid pre-wash, but before the $SO_2$ wash, as a separate wash at a wash-water pH of 2.5–4.5.

In addition to this, it is possible to carry out the simultaneous $NO_x$ wash together with the $SO_2$ wash or after the $SO_2$ wash with a dedicated wash-water system at pH values of 2.5–8.0.

It has been found that, according to the present invention, the simultaneous $NO_x$ wash can be increased and forced to a considerable degree if the polycarboxylic acid (entrapped EDTA) or phosphonic acid is previously complexed with iron-II sulfate, i.e., before addition to the wash-water system. According to the present invention, this is done according to the pH value of the polycarboxylic iron solution, preferably by means of sulfuric acid or other mineral acids at pH values above pH 5 and by means of alkalis or earth alkalis at pH values of less than pH 5. Thus, the pH value in the wash-water solution can be varied as desired, without any effect on the stability of the iron-II complex.

According to the present invention, the complexing of the iron-II complex of the phosphonic acid takes place by the addition of alkali or alkaline earth liquors up to a pH value of 8–10. After this, this iron complex too is stable in the face of all pH changes.

The polycarboxylic acid solutions of phosphonic acid solutions can be added to the wash-water with the pH value that is desired at the time.

The results obtained during simultaneous $SO_2$ and $NO_x$ washing are not, as a rule, satisfactory.

Very often, the ratio of $SO_2$ to $NO_x$ is not configured such that a good reaction in the direction of the $NO_x$ separation takes place.

In order to bring about the separation of the $NO_x$ independently of the $SO_2$ content in the crude gas, according to the present invention it is proposed that in a first washing stage, preferably by means of a slightly acidic short-term wash process, alkaline or alkaline earth bisulfite is produced, for example, calcium or sodium bisulfite, or the like, this bisulfite that is formed being added to the $NO_x$ washing alone or to the simultaneous scrubbing stage, which simultaneously washes $SO_2$ and $NO_x$, in which regard polycarboxylic acid (entrapped EDTA) and/or phosphonic acid is added to this wash stage.

In place of the auto-generation of alkaline earth or alkaline bisulfite, solid sulfite salts or waste sulfite liquors can be used for the simultaneous $SO_2$ and $NO_x$ or single $NO_x$ washing as outside supplies.

As desired, previously-mentioned components are added to the second wash stage, or the second wash stage is used solely as an $SO_2$ wash stage, the bisulfite from the first wash stage being supplied to the third wash stage after the $SO_2$ washing and polycarboxylic acid and/or phosphonic acid (entrapped EDTA) $NO_x$ washing being used in the third wash stage.

During the simultaneous washing out of $SO_2$ and $NO_x$ from the smoke gases discharged by combustion plants, the washing out of the $SO_2$ at an efficiency of greater than 90% presents no problem; however, the washing out of $NO_x$ at a level greater than 70% is scarcely representable, or can be achieved only under very specific conditions, i.e., the molecular ratio of $SO_2$ to $NO_x$ must be greater than 2:1.

In order to achieve very high levels of $NO_x$ washout despite this, in smoke gases that have a low $SO_2$ value, according to the present invention it is proposed that a two-stage wash process be carried on as follows:

In the first stage, $SO_2$ is washed, preferably with polycarboxylic acid and a chalk additive, for example, chalk in the form of rock chalk, fine chalk, or dolomite.

In the second wash stage, the exhaust gas, greatly reduced by the $SO_2$, is washed with an alkaline liquors, preferably caustic soda, polycarboxylic acid (incl. EDTA) being added to this alkaline lye or caustic soda. The NO is converted to nitrogen, i.e., primarily passed with the pure gas to the atmosphere, and the residual $SO_2$ and, in order to retain the iron as a bivalent iron in the complex, since too few $SO_2$ molecules are available, a reducing agent such as ascorbic acid is added.

In order to prevent enrichment of sodium sulfate or sodium sulfite portions a part of the wash solution of the second wash system is passed to the first wash system in order to convert the alkali sulfates or sulfites to gypsum.

In order to achieve a high level of $NO_x$ separation in exhaust gases subsequent to combustion plants that have an $SO_2/NO_x$ ratio of less than 2:1, according to the present invention a two-stage process is proposed, in which the first wash stage has the task of separating the $SO_2$ and does not have the main feature of simultaneous $NO_x$ separation, and that in the second wash stage the main feature is separation of $NO_x$, and that in this stage, of necessity, a certain part of the $SO_2$ is washed out, in which connection, both wash stages operate with separate wash-liquid systems; the first wash liquid system being operated with carboxylic acid with polycarboxylic acid (EDTA), polycarboxylic acid (EDTA) or diphosphonic acid, which contain bivalent iron complexes, being added to the second wash stage, with the simultaneous addition of oxygen-bonding substances such as salts of the sulfur acids and/or reducing agents such as ascorbic acid.

The wash-liquid system of the second wash stage has a wash-liquid circulation tank and a settling tank, a quantity of wash liquid enriched with polycarboxylic acid (EDTA) and iron-II salts or diphosphonic acid and reducing agent such as ascorbic acid being added to the wash-liquid circulation tank and a portion fed from the wash-liquid circulation tank to the settling tank, to which calcium hydroxide or calcium oxide is added, the $CaSO_3$ or $CaSO_4$ that is thus precipitated being moved to a water-removal station and from here the filtrate passing to the wash-liquid circulation tank and the solids in the wash-liquid tank passing to the first washing stage. It is preferred that the temperature for washing stage 2 be at approximately 50° C.

It is known that EDTA solutions that contain the iron-II complexes for $NO_x$ reduction alone are not stable.

There is no way of preventing the iron-II from becoming oxidized to iron-III, the $NO_x$ absorption during the wash process being greatly reduced thereby.

It has been found that the used solution can be activated and stabilized by the addition of alkaline sulfite and/or a further reducing agent, preferably ascorbic acid.

In addition, sodium dithionite is added to the reducing agent for stabilization and reactivation.

It is known that $SO_2$ can be washed with limestone, chalk hydrate or NaOH.

It is also known that in a two-stage plant sodium sulfite and additional reducing agent can be added in order to liberate the $N_2$.

This process is stable and functional only if the iron in the polycarboxylic acid chelate complex is retained as a bivalent iron.

It has been found that not only sodium sulfite plus a further reducing agent is required, in order to keep the bivalent iron stable in the wash solution, but that, according to the present invention, only sodium dithionite is needed in place of this combination of additives.

According to the present invention it is also proposed that in place of EDTA nitrile triacetic acid (NTA) and its salts be used, these being biodegradable and thus the amount of water that is to be discharged can be treated very simply, and can be passed harmlessly to the drainage channel.

It is known, that $SO_2$ and $NO_x$ can be separated in a wash solution in a single washer or in multistage washers, in which the wash solution has been enriched with limestone, fine chalk, EDTA and/or polycarboxylic acid.

It is desirable that in the simultaneous $SO_2$ and $NO_x$ separation the end product should be a usable or safely discardable.

The most familiar product is the $CaSO_4$ end product.

The difficulty of separating $SO_2$ and $NO_x$ in one stage is based, on the one hand, on the fact that because of the $SO_2$ washing and the necessary oxidation $CaSO_4$ has to be provided, whereas on the other hand a reducing characteristic has to be present in the same wash system so as to reduce the iron chelate above the deposited NO and to obtain the iron-II.

Since this does not take place together and in harmony, there are high rates of oxidation from iron-II to iron-III and thus inactivation of the complex. In order to reactivate the complex portion, the present invention provides that some of the wash solution, preferably the filtrate from the de-watering of the solids, be treated in a special tank with reducing substances such as ascorbic acid, sodium pyrosulfite, sodium dithionite, etc., in order that after a specific delay time the reactivated additives can be returned to the wash process.

According to the present invention, it is further proposed that some of the liquid that is used for the washing process with such additives as limestone or chalk hydrate and EDTA or NTA and/or polycarboxylic acid and $CaSO_4$ or $CaSO_3$, is passed through a solid/liquid separation stage, with delivery of the inactive liquid into a reaction tank in which reducing additives and/or metallic iron such as iron filings and other forms of metallic iron have been added, the reducing additives being added in the acid phase, preferably pH value of less than 6, activated by means of a pump and fed back to the wash water supply through an inlet plane and/or made available for the wash process once again through pairs of nozzles.

It is preferred that sodium bisulfite, ascorbic acid, sodium dithionite and metallic iron and similar reducing agents be used as the reducers.

Before being passed to the activation stage, some of the filtrate water is passed into the firebox of the boiler with its contained salts to be destroyed in an environmentally safe manner. Part of the filtrate water is sprayed onto the coal fuel prior to use in the boiler.

In order to achieve the highest possible efficiency for $SO_2$ and $NO_x$ separation in a multi-stage wash system, the present invention proposes that in the first wash stage the wash liquid in the circulation stage, with a pH value between pH 3 and pH 4 be passed over an iron reactor, and in the subsequent, second stage the circulation stage water has a pH value of greater than 5, and that sodium dithionite be added to the wash circulation stage as an innoculant in order to keep the iron-II chelate above the formed redox potential in both wash stages.

It is known that the redox potential during simultaneous $SO_2$ and $NO_x$ separation can be established according to the molar ratio between $SO_2$ and $NO_x$ by the addition of reducing agents, e.g., pyrosulfite or sodium dithionite, ascorbic acid, i.e., chemically, by reducing agents.

According to the present invention, it has been found that for the purposes of the efficient configuration of the redox potential, it is possible to use an electrochemical method apart from the chemical method, in order to save the reducing agent totally or in part by using electrolysis.

It is known, that $SO_2$ and $NO_x$ can be washed out simultaneously by using a single-stage washer. However, the results so obtained are unsatisfactory.

For this reason, the present invention proposes that in a single-stage washer, regardless of whether it is configured as a counterflow or straight-flow washer the zone that is the first to come into contact with the $SO_2$ be adjusted so as to be acidic in order that the mol ratio of $SO_2$ to $NO_x$ during $NO_2$ operation be as high as is feasibly possible in favour of the $SO_2$.

In the subsequent stage, for purposes of efficiency, the wash water is to be at a higher pH value, e.g., greater than pH 5, in order to wash out the $SO_2$ and the residual traces of $NO_x$ to the prescribed value.

It is known that for simultaneous $SO_2$ and $NO_x$ separation the $SO_2$ molecular weight must predominate over the $NO_x$ molecular weight.

Very frequently, especially in the boiler systems used for smelting there is no such necessity according to the present state of the art.

According to the concept of the present invention, a process is proposed with which $SO_2$ and $NO_x$ can be washed simultaneously in one wash stage, such that the $SO_2$ is converted to $CaSO_4$ and the $NO_x$ is reduced to $N_2$, and the liberated oxygen is added to the $SO_2$.

According to the present invention, this is achieved in that the smoke gas is passed into a single stage counter flow washer, when the smoke gas is first forced against a wash liquid with positive redox potential in one or several nozzle planes, additives such as limestone or chalk hydrate being added to this wash water and preferably carboxylic acid is added to the additives in the wash water so as to improve solubility, the last nozzle plane consisting of one and/or several nozzles or nozzle planes; behind the first nozzle plane arrangement in the last nozzle plane as wash liquid with negative redox potential is discharged, this being adjusted, for example, by the addition of dithionite and/or other reducing agents, or by means of a reduction vessel that is filled, for example, with iron plates.

In addition, by electrochemical reduction (electrolysis) dithionite can be added as a reducing agent, so that $SO_2$ and $NO_x$ can be separated simultaneously and oxidized in the washer sump over the oxidation system, and nitrogen $N_x$ can be transferred through the nozzle arrangement according to the present invention, through the droplet separator system to the hearth and/or cooling tower and the calcium hydrate separated off.

The wet process that is used to separate the NO, that works in a reducing fashion, requires the use of reducing chemicals, for example, metalic iron, hydrogen sulfite or sodium dithionite. The chemicals introduce ballast materials into the circulation system of the washer, and these have to be washed out once again. Chloride, that originates from the fuels, is carried in by the smoke gas, and this too must be removed.

Since the solutions that are removed contain complex initiators such as ethylenediaminotetraacetate (EDTA) or nitrilotriacetate (NTA) as well as a range of transition metals, it is necessary to provide a waste-water treatment system to ensure that the waste water conforms to the standards that have been authorized.

In the case of nitrogen oxyreduction that works catalytically, (with hydrocarbons or ammonia), it is necessary to use valuable materials such as catalysts and hydrocarbons or ammonia.

The catalysts work effectively only in a narrow range of temperatures from approximately 320° C. to 380° C. They are vulnerable to wear caused by dust. They can be contaminated by metals such as lead. In the case of catalysts that follow generating station firing systems, sticky deposits may build up from $SO_3$, $H_2O$, and $NH_3$ and fly ash, these consisting predominantly of $NH_4HSO_4$. These deposits can clog components such as air preheaters, catalysts, and electrostatic filters that are located in the path of the smoke gases, and thus cause shutdowns. The catalysts are additional systems that cause not inconsiderable pressure losses, the incorporation of which, especially as retrofitted items in existing generating stations, is linked with major technical, space and economic disadvantages. The elimination of exhausted transition-metal catalysts and fly ash, that contains ammonia salts, entails further difficulties. If ammonia gets into the wash solution used in smoke gas desulfurizing systems that have gypsum as an end product, it may under certain circumstances be necessary to remove ammonium compounds from the gypsum and the waste water, since ammonia ions can poison fish and ammonia may be given off by bypsum products and cause troublesome odour problems. Finally, ammonia is an hazardous product that only be transported, loaded, and stored at great expense as a result of the safety measures that are required.

It is the purpose of the present invention to reduce nitrous oxide, that makes up the greater portion of exhaust gas, electrochemically by means of a potentiostatic process. This reduction take place in the aqueous phase, in which connection the solubility of the nitrous oxide can be greatly improved in a known manner by complexing, e.g., with bivalent iron. By adjusting the redox potential required for the reduction with electric current instead of by reducing chemicals the wash circulation stage required for processing the exhaust gas can be kept small and does not have to be provided with ballast ions, for example, sodium or sulfur compounds that have to be removed from the circulation stages and then cause additional costs in the form of waste water treatment and by the need to remove them from the gypsum. Because of the advantage entailed in the present invention, namely the reduction of nitrous oxide in the same plant as is used predominantly for desulfurization of the smoke gases with, for example, gypsum as the end product, there is for the most part no need for systems used for the separate reduction of nitrous oxide. There is no permanent pressure loss and no hazardous materials are required.

The present invention follows the basic concept of using existing or planned smoke gas treatment systems for reducing sulfur dioxide during the removal of nitrous oxide from the exhaust gases discharged by combustion plants, this being done so that no additional apparatus that can be cause a pressure loss on the exhaust side is required. In addition, as far as is possible the wash circuit is closed, and in any case no additional ballast materials are introduced as chemical reducing agents that can, in their turn, cause additional problems. Other components of the smoke gases, such as chlorides and soluble transitional elements, are reduced in addition to the nitrous oxide.

According to the present invention, the required redox potential for reducing nitrous oxide to elementary nitrogen is maintained with a potentiomeric device. The two electrons that are required for the reduction of No are made available at the cathode that is, for example, of carbon. The hydrogen sulfite that is formed from the $SO_2$ of the exhaust gas can serve as the reducing carrier substance, which becomes dithionite, transfers the electrons onto the NO bound complexly to, for example, bivalent iron, and is itself oxidized to sulfate and finally removed as gypsum.

The chloride that originates from the smoke gas is oxidized in the solution to elementary chloride at the noncorrodable anode that is, for example, of titanium, and this chlorine can be removed from the wash circulation system and used, for example, in the chemical industry.

The dissolved transition metal ions that are contained in the wash solution are reduced on the cathode and can also be removed from the wash solution. If deemed desirable, the separated metals can be recovered.

The adjustment of the redox potential can take place in the washer sump or more advantageously in a special tank from which the reducing, regenerated wash solution is passed to conventional spray nozzles.

In order to separate the reducing and oxidizing area around the cathodes and the anodes these are to be separated by membranes so as to avoid unintended mixing; these membranes can be semi-permeable or only permeable to anions or cations.

The technical and the technico-economic effects of the solution according to the present invention lie in the widespread avoidance of the need for additional apparatus, the fact that neither hazardous nor costly materials such as hydrocarbons, ammonia, and catalysts are used, the avoidance of a further pressure loss on the exhaust-gas side and the rapid refitting and start-up of power generating stations. The additions that are required by electrochemical reduction are based on iron salts and complex initiators such as EDTA, NTA and/or formic acid, a potentiostatic switching with the cathode and anode cells that are separated by the membranes, a capture system for elementary chlorine and, if needs be, processing system for cathodically separated metals. The catalytic reduction processes that are so widespread today lead to high investment costs, operational shutdowns caused by gummy deposits, limitations of exhaust-gas temperatures, and high operating costs caused by additional pressure losses, catalytic wear and the consumption of reducing agents.

As has already been stated, the crude gas can first be passed to a straight-flow wash stage, in which connection the wash liquid from the drain of the first wash stage, adjusted over an iron reactor with a negative redox potential is first put in contact with the exhaust gas.

The second wash-nozzle plane is provided with a pump and has a redox potential that is weaker than that of the upper nozzle plane. The counter-flow washer, that is run alkaline, operates with the pump in a dedicated circulation system with the addition of sodium dithionite and other reducing agents from a tank.

According to the present invention the simultaneous $SO_2$ and $NO_x$ separation process is improved by additional steps in the process in that the straight-flow washer, into which the crude gas is first introduced, is operated in the first nozzle plane with a wash liquid which, charged over an iron reactor with a negative redox potential is first put in contact with the gas flow and then a separation of the bound $NO$—$NO_2$ from the area of the nozzles to elementary nitrogen takes place in the subsequent nozzle planes.

A wash liquid is supplied to the iron reactor, and this liquid is adjusted to a negative redox potential by reducing agent from the tank.

The nozzle planes that are last used in the wash process are acted upon by a wash liquid that has a negative redox potential that is preferably controlled by reducing agent from the tank and/or from the electrolysis station.

The nozzle planes in the counter-flow washer and the nozzles in the straight-flow washer have a smaller redox potential than the upper nozzle planes in the counter-flow washer and in the straight-flow washer.

Adjustment of the redox potential takes place over the iron reactor and by the selection of reducing agents, such as sodium dithionite and/or by electrolysis.

A process has been described above, in which, for adjustment of the redox potential and for stabilizing the iron chelate solution, in place of the sodium dithionite an electrolysis process has been incorporated in the process in addition to the additives cited above.

According to the present invention, this process is so controlled that in the event of an $SO_2$ content that is insufficiently high in relation to the $NO_{x2}$ content, pyrosulfite is dosed into the washing process for the difference of $SO_2$ to $NO_x$ with the simultaneous addition of limestone and/or chalk hydrate and addition of NTA or EDTA, and, in order to control the redox potential, an iron reactor is incorporated in the wash liquid circulation system, whilst in order to stabilize the redox potential and simultaneously improve the solubility of the limestone and/or chalk hydrate, and to simultaneously stabilize the iron chelate an acid, preferably formic acid, is added, and in order to achieve more rapid control of the redox potential in the quantity of liquid a suitable quantity of liquid is passed through electrolysis.

As a result of these measures the process can be matched very rapidly to a specific task.

BRIEF DESCRIPTION OF THE DRAWING

Exemplary versions of the present invention are described in greater detail on the basis of the drawing appended hereto. In the drawing.

SPECIFIC DESCRIPTION

Figure 1:
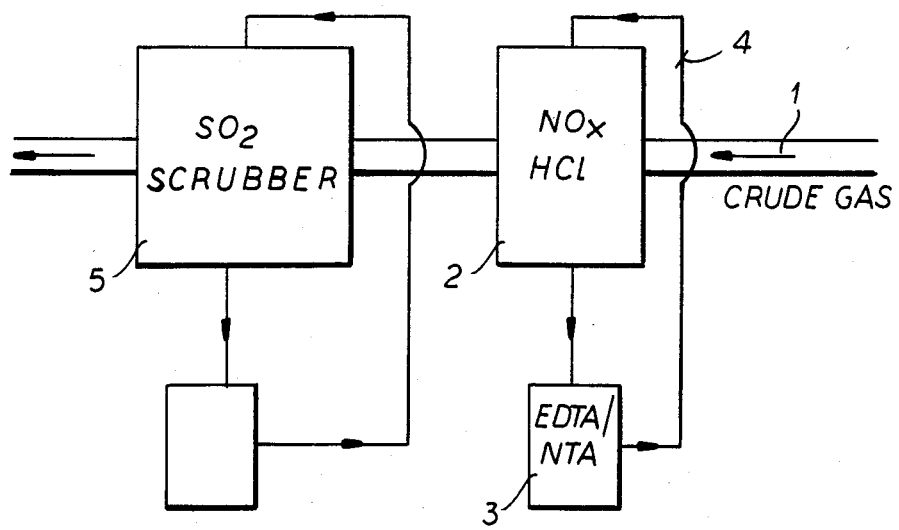
FIG. 1 is a schematic representation of a first version of the separation process.

In FIG. 1, 1 indicates the crude gas inlet, 2 indicates the $NO_x$—HCl wash, 3 indicates the wash water supply tank with the EDTA or phosphonic acid additives; 4 is the $NO_x$ or $NO_x$+HCl wash, and 5 is the $SO_2$ wash.

Figure 2:
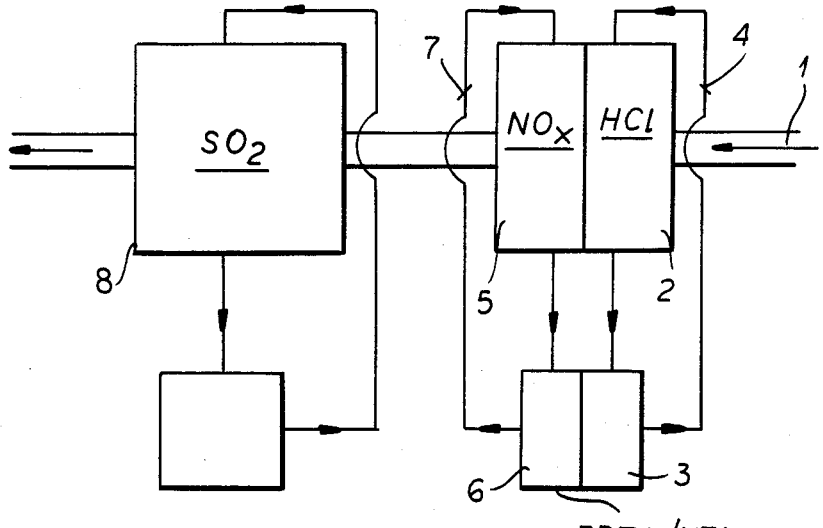
FIG. 2 is a diagram showing a variation of the process as in FIG. 1.

In FIG. 2, 1 indicates the crude gas inlet, 2 indicates the HCl wash, 3 is the wash water supply tank, 4 is the pre-wash circulation system, for example, a HCl wash, 5 is the $NO_x$ wash, and 6 is the wash water supply tank with the EDTA and/or phosphonic acid additives, 7 is the wash water circulating system and 8 is the $SO_2$ wash.

Furthermore, according to the present invention, phosphonic acid can be used in place of EDTA in the main wash circulating system, also without a pre-wash during the desulfurization of smoke gas, particularly if coal with a low chloride content is being burned.

Figure 3:
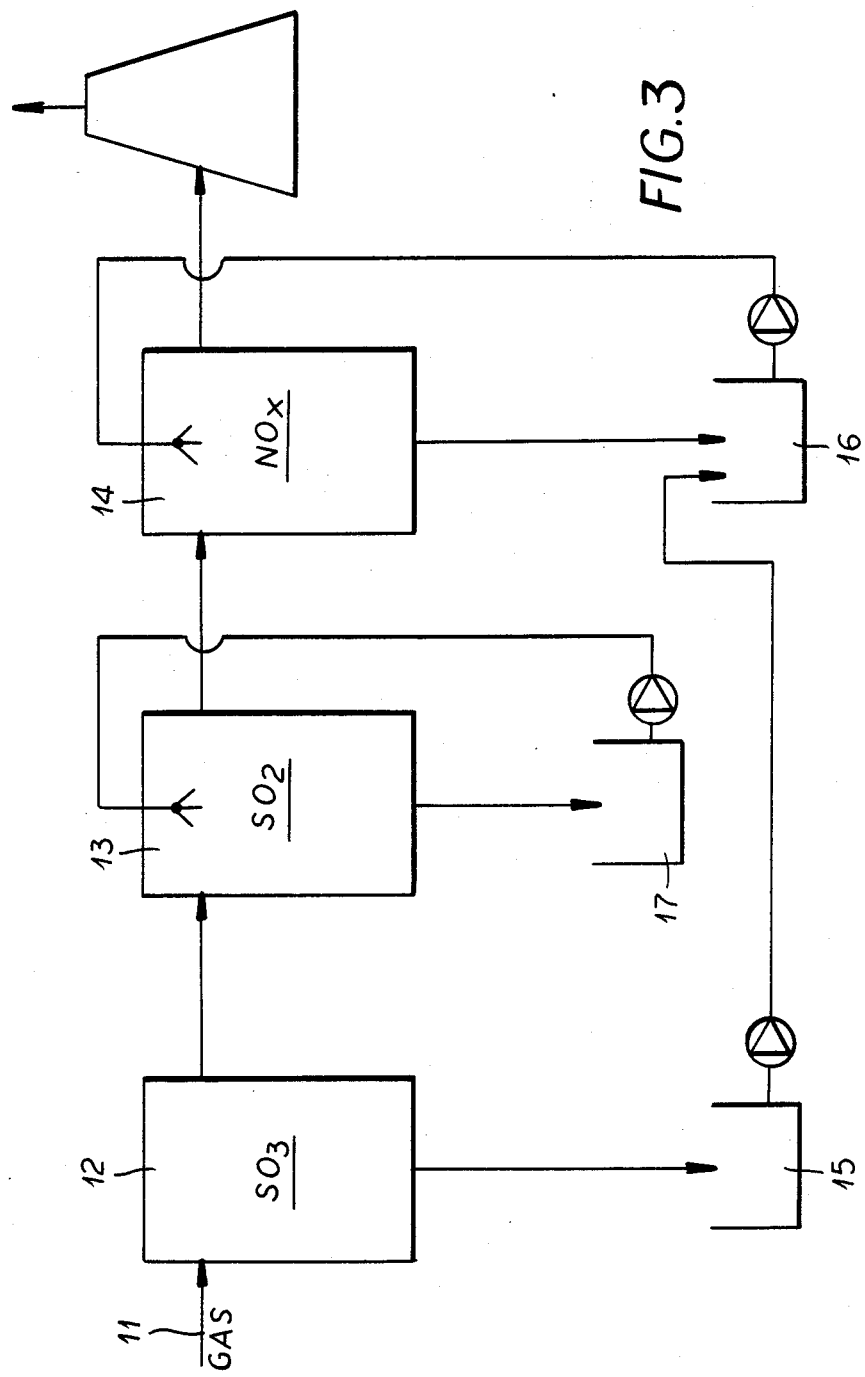
FIG. 3 is a flow diagram schematically representing a second version of the separation process.

In FIG. 3, 11 indicates the crude gas, and 12 indicates the so-called sulfite washer that is preferably operated at a slightly acidic level and produces ($Ca(HSO_3)$-$_2Ca(HSO_3)_2$) with a wash that is relatively short in the physical sense.

This is followed by 13, the $SO_2$ washer. The bisulfite that is formed is used in a subsequent wash stage used for the simultaneous washing of $SO_2$ and $NO_x$ or for washing $NO_x$ alone; 14 indicates the $NO_x$ washer, 15 the sulfite basin that follows the sulfite separator 12 and transfers the sulfite that is formed to the $NO_x$ wash-water reservoir 16, where it is passed to the $NO_x$ washer 14 by means of the pumps, in order that, oxidized to $CaSO_4$, it can be used later. The sump of scrubber 13 is shown at 17. The bisulfite that is formed from the wash stage 12 can be used in the washer 13 for the simultaneous washing of $SO_2$ and $NO_x$, and it can also be used in the washer 14. Despite this, the concept of the present invention of production of bisulfite for washing out $NO_x$ is preserved, and the further concept of the invention, of $NO_x$ washing by means of polycarboxylic acids with the use of the bisulfite by auto-production or purchase, is also maintained.

Figure 4:
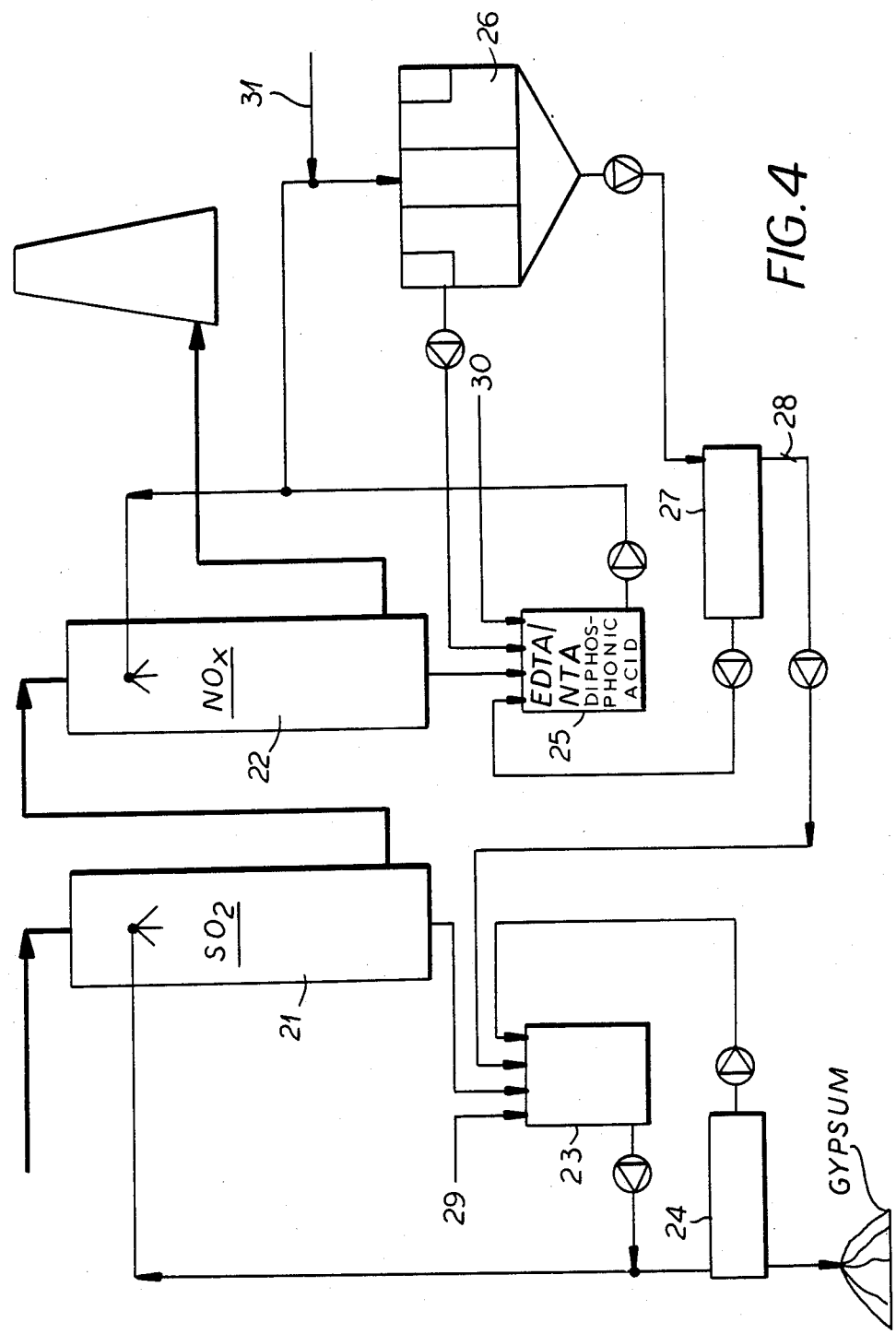
FIG. 4 is a schematic representation of a third version of the separation process.

In FIG. 4, 21 indicates the wash stage 1, 22 indicates the wash stage 2, 23 is the wash liquid circulation tank, 24 is the so-called gypsum station for dehydrating the $CaSO_4.2H_2O$ that is discharged; 25 indicates the wash liquid circulation tank for wash stage 2, the wash liquid being used with limestone or chalk hydrate or caustic soda+iron-II salt+polycarboxylic acid (EDTA) or diphosphonic acid and reducing agents such as ascorbic acid; 26 indicates the gravity separator for precipitating $CaSO_3.\frac{1}{2}H_2O$ and $CaSO_4.2H_2O$. 27 is the $CaSO_3$/$CaSO_4$ dehydrating station, the filtrate being passed to the tank 25 and the solid portion 8 being passed to the wash liquid circulation tank 23, and from here the still unoxidized $CaSO_3\frac{1}{2}H_2O$ with the gypsum crystal $CaSO_4.2H_2O$ is introduced automatically into the wash process of wash stage 1 and converted completely to $CaSO_4.2H_2O$ over the subsequently incorporated oxidizer.

Carbon or polycarboxylic acid and chalk in the form of limestone, chalk hydrate, or dolomite, preferably white chalk, numbered 29, is added to the first wash circulation stage and predominantly $SO_2$ is washed out. The washing out of the $SO_2$ can be effected more or less intensively vis-à-vis the second $NO_x$ wash stage.

According to the present invention, in the second wash stage, the exhaust gas, greatly or less greatly cleansed of $SO_2$ is at 30 to the greatest extent free of $NO_x$ by the use of a wash water solution to which caustic soda, calcium hydroxide or limestone or magnesium hydroxide or dolomite, as well as polycarboxylic acid (EDTA), diphosphonic acids+iron-II-salt and reducing agent, such as salts of the sulfuric acid or ascorbic acid, are added.

Partial quantities from tank 25 are passed to tank 26 and here, at 31, with the additional supply of chalk hydrate or calcium oxide (CaO) the calcium sulfite ($CaSO_3$) or calcium sulfate ($CaSO_4$) is precipitated and thickened.

The same applies especially for the use of caustic soda and magnesium hydroxide in tank 25.

The concentrated solids are washed from the tank 26 through centrifuges or drum-type vacuum filters and dehydrated to a few percent water.

The filtrate is passed to tank 25 and the solid is passed from 28 to the tank 23 and plays an active role in the $SO_2$ washing of wash stage 1 and is oxidized in the washer sump of the washer 21 and is discharged as usable gypsum by the gypsum dehydration at 24.

According to the present invention, the EDTA of the simultaneous $SO_2$ and $NO_x$ wash stage is not passed to wash stage 1, where simultaneously $SO_2$ is washed and converted to gypsum since here to a great extent the EDTA.

(a) is discharged with the residual water from the gypsum and with the water to be given off;

(b) is discharged from wash stage 1 to prevent $CaCl_2$ concentration.

As a rule, in a 600 MW block up to 30 m³ of wash water must be discharged from the wash water circulation stage of wash stage 1 in order to arrive at a moderate calcium chloride enrichment that is not too high in wash stage 1.

It is preferred that no water be removed from the second wash stage. The solids are washed and introduced into the wash circulation stage 23 from the gypsum dehydration stage 27 with a residual moisture of less than 10%, for example.

According to the present invention, the tank 25 contains polycarboxylic acids (EDTA) or disphosphonic acids, that contain bivalent iron, complexly bound, and the $NO_x$ wash is carried out at a temperature that is preferably lower than 50° C. at a pH value of preferably 3.5–10.5.

Since the $SO_2/NO_x$ molecular ratio in the exhaust gas of the second wash stage is too low, in order to obtain the iron-II complex, additional oxygen-binding substances, such as salts of the sulfurous acid or reducing agent such as ascorbic acid are added to the wash solution.

Figure 5:
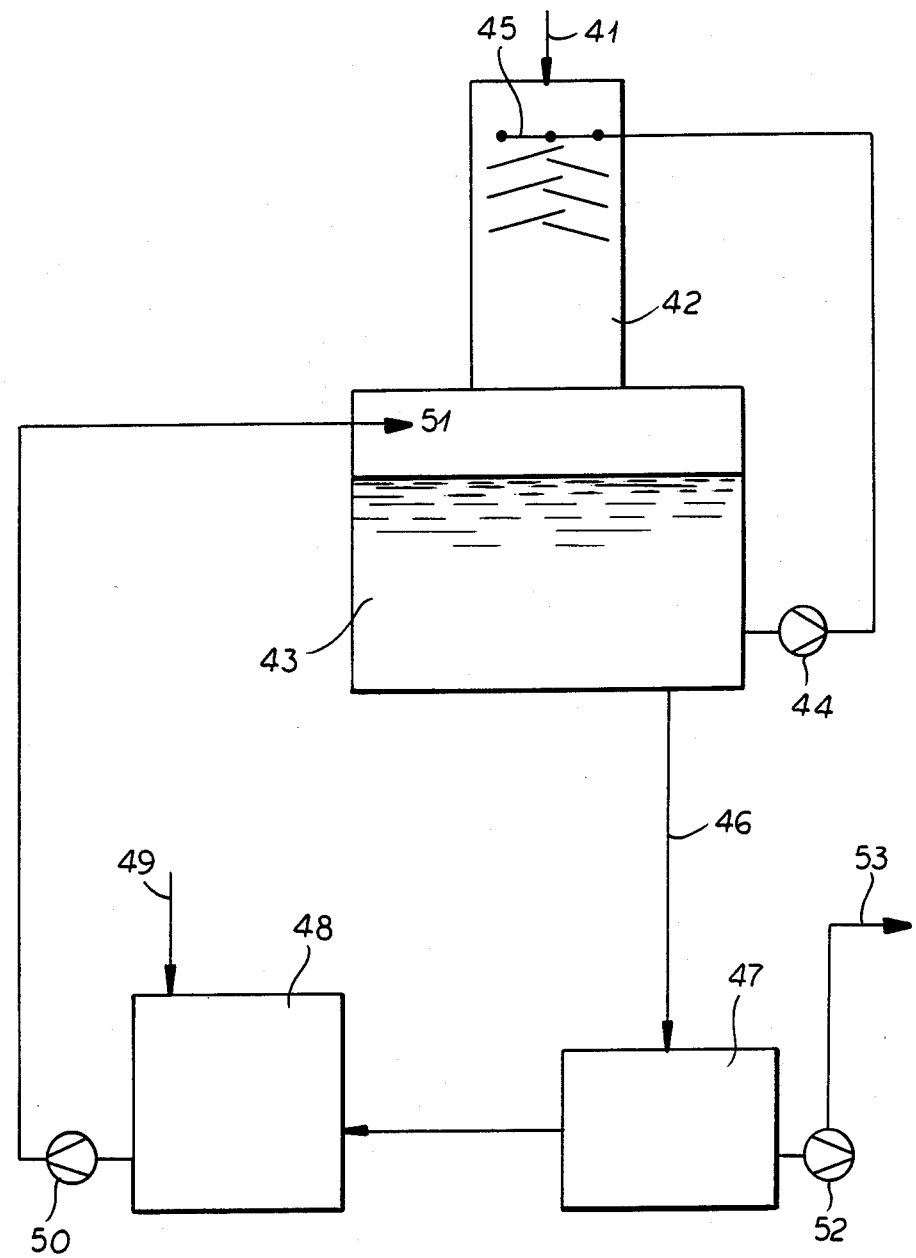
FIG. 5 is a schematic representation of a fourth version of the separation process.

In FIG. 5, 41 indicates the crude gas that contains $SO_2$ and $NO_x$, 42 indicates the wash system, 43 indicates the wash water sump, 44 is the circulation pump for the nozzle planes 45, and 46 is the drain from the circulation water tank 43 to the dehydration station 47.

From the dehydration station 47, some of the water is passed to the regeneration tank 48.

In this, there is an addition 49 of the reducing agent to activate the wash liquid.

The pump 50 passes the activated wash liquid through an inlet 51 to the wash liquid tank 53; 52 is a pump, and 53 is the hot gas zone.

After coming into contact with the $SO_2$ and the $NO_x$ the liquid passes through the drain of the wash liquid tank 43 and on to a solids-liquid separator stage 47 that passes the separated liquid wash liquid, which is inactive, to the activator tank 48 in which, by the addition of reducing agent at 49, preferably ascorbic acid, sodium bisulfite, sodium dithionite or similar reducing substances by means of a pump 50, it is reactivated and passed to the wash liquid tank 43 or 51, and/or at 45 can be sprayed once again directly into a nozzle plane, and some of the filtrate water that passes from 47 to 48 is transferred through a pump 52 into the hot-gas zone 53 of the boiler system where it is destroyed thermally, or else is sprayed onto the coal.

Figure 6:
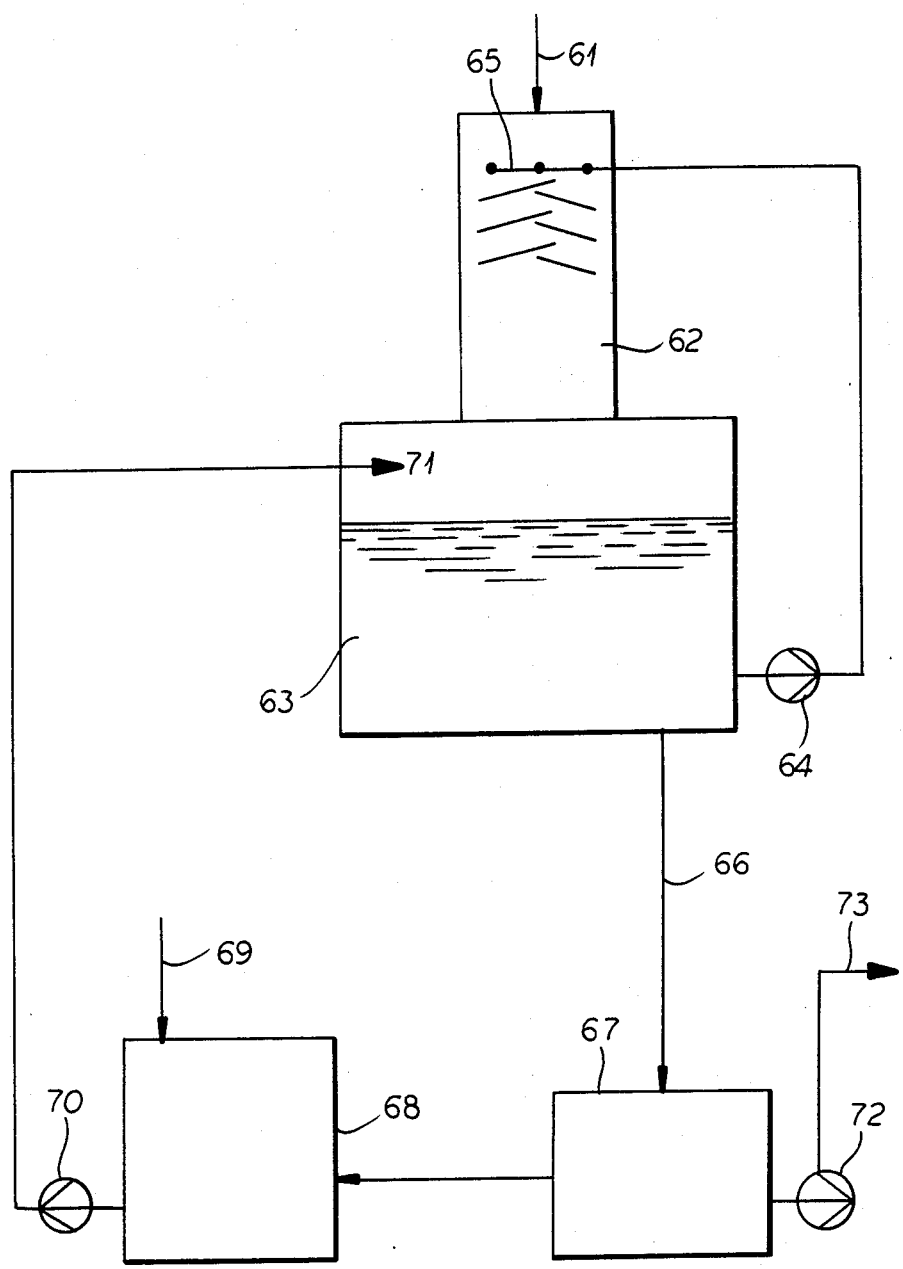
FIG. 6 is a schematic representation of a fifth version of the separation process.

In FIG. 6, 61 indicates the crude gas that contains $SO_2$ and $NO_x$, 62 indicates the washer system, 63 indicates the wash water sump, 64 is the circulation pump for the nozzle planes 65, 66 is the drain from the circulating water tank 63 to the dehydration station 67. From the dehydration station 67, some of the water passes to the regeneration station 68. In this station there is an addition 69 of the reducing agent to activate the wash liquid; the pump 70 moves the activated wash liquid through an inlet 71 to the wash liquid tank 63; 72 is a pump, and 73 is the hot-gas zone.

After coming into contact with the $SO_2$ and the $NO_x$ the liquid passes through the drain of the wash liquid tank 63 of a solids-liquid separator stage 67 that passes the separated liquid wash liquid, which is inactive, to the activator tank 68 in which, by the addition of reducing agent at 69, preferably ascorbic acid, sodium bisulfite, sodium dithionite and/or metallic iron in the form of powdered iron, iron filings or similar forms and similar reducing agents by means of a pump 70, it is reactivated and passed to the wash liquid tank 63 or 71, and/or at 65 can be sprayed once again directly into a nozzle plane, and some of the filtrate water that passes from 67 to 68 is transferred through a pump 72 into the hot-gas zone 73 of the boiler system where it is destroyed thermally, or else is sprayed onto the coal.

Figure 7:
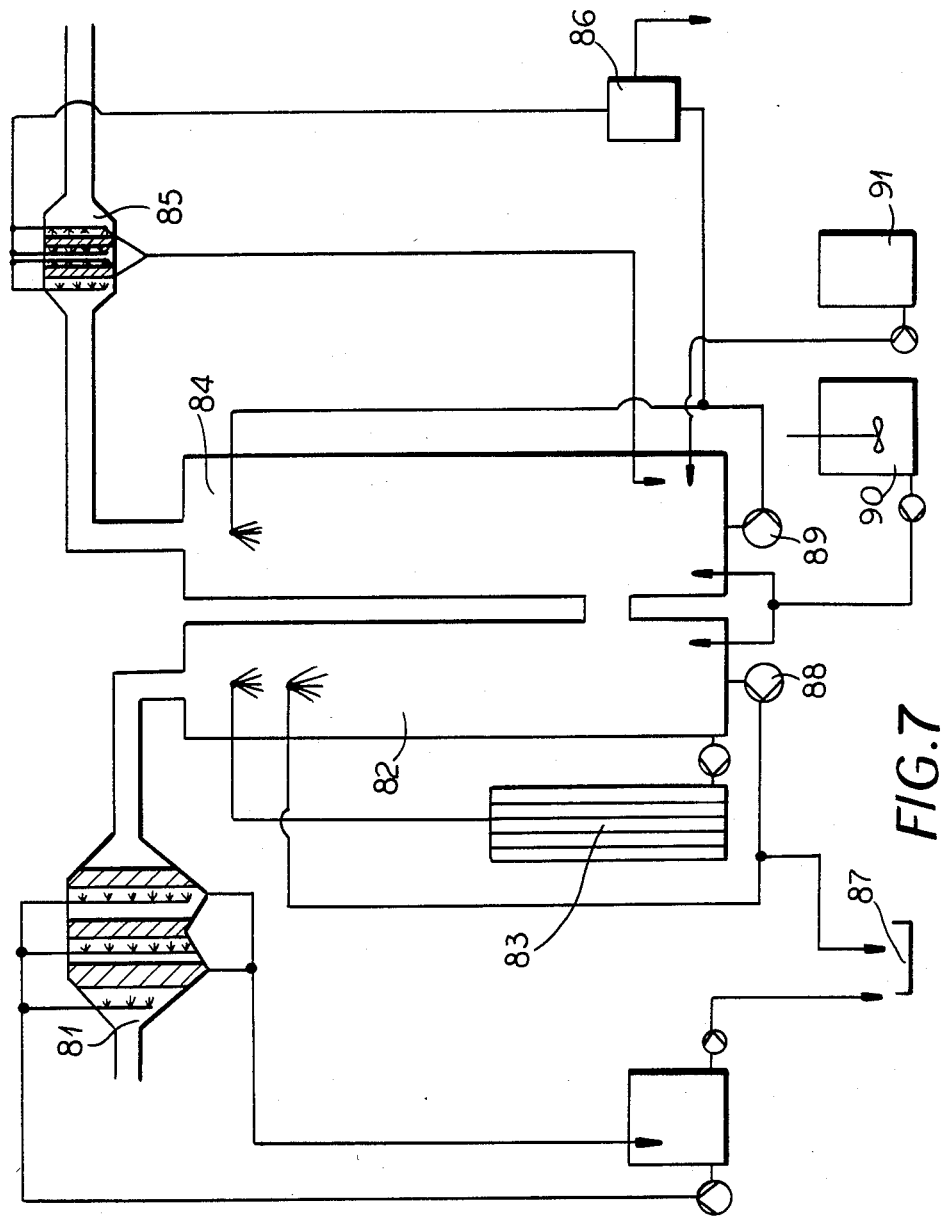
FIG. 7 is a schematic representation of a sixth version of the separation process.

In FIG. 7, 81 indicates the so-called pre-washer, which serves to separate chlorine when coal that contains chlorine is burned; 82 indicates the wash stage that is operated as acidic, preferably in the range between pH3 and pH4; 83 indicates an iron reactor over which the liquid from the acidic wash circulation stage is passed; 84 is the alkali wash water tank, in which the wash liquid is moved in the circulation state at a pH value of greater than pH 5; 85 is a droplet separator after the second wash stage 84; 86 indicates a decanter that cleans part of the wash liquid from the second wash circulation stage 84 in order to supply it to the droplet separator for rinsing; 87 is the wash liquid discharge to the gypsum dehydration stage (centrifuge or belt-type filter); 88 is a circulating pump for the wash circulation state 82; 89 is the wash liquid pump for the washer 84, second wash stage for the circulation system with a pH value of greater than pH 5, some passing through the decanter 86 in order to remove some of the solid (gypsum); 90 is the limestone or chalk hydrate mixing tank; 91 is the tank for the sodium dithionite, ascorbic acid or an equivalent reducing agent.

This process technology ensures that in the first wash stage, the required redox potential is generated by the iron reactor 83 in order to keep the iron-II chelate in the wash solution at a low pH value of 3-4. According to the present invention, in the second wash stage, a redox potential is generated by the addition of sodium dithionite in the wash liquid according to the present invention, at a pH value of greater than 5 as opposed to the first wash stage at less than 4, so that the iron-II chelate is retained and thus a correspondingly high simultaneous separation of $SO_2$ and $NO_x$ is ensured.

Figure 8:
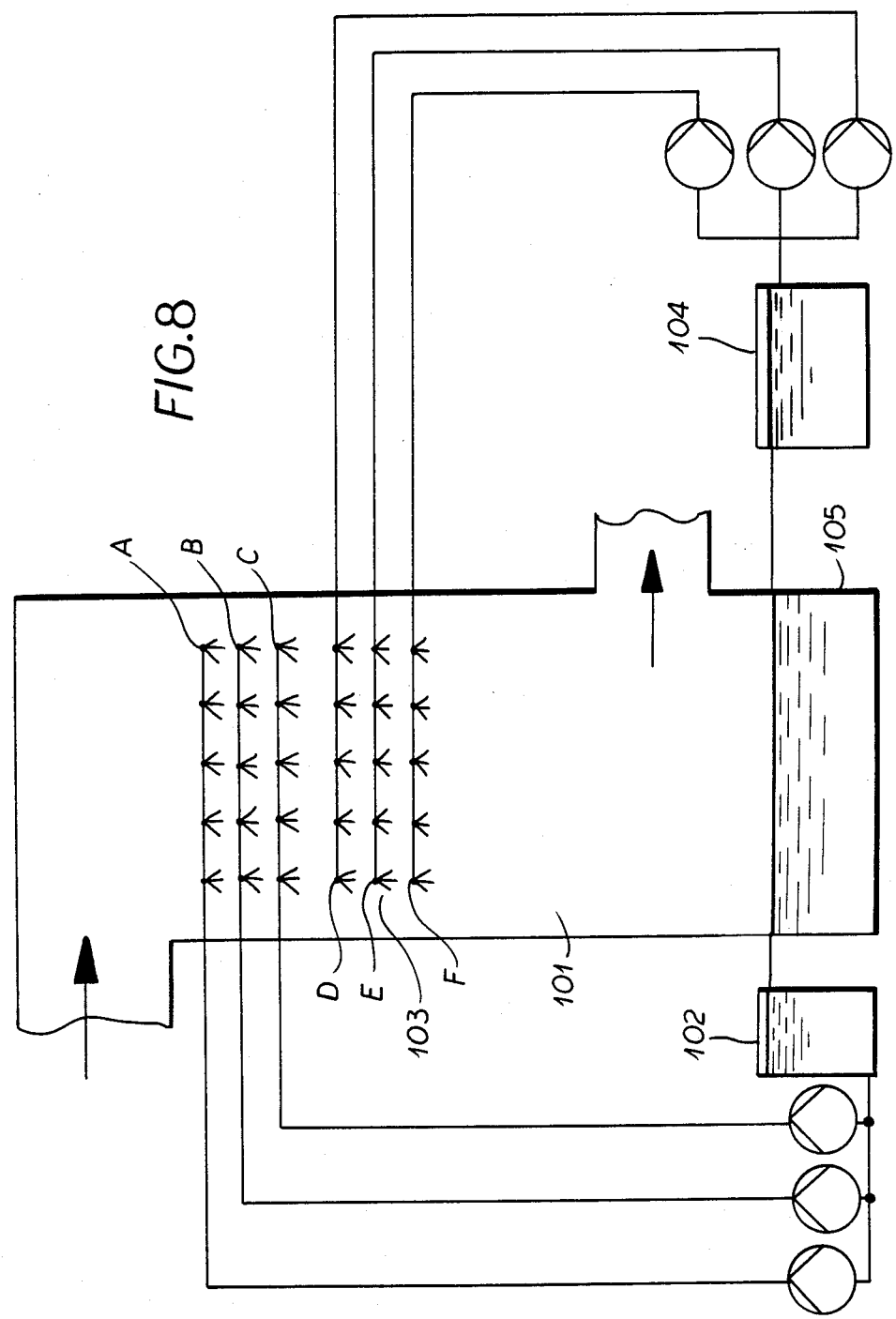
FIG. 8 is a schematic representation of a seventh version of the separation process.

In FIG. 8, 101 indicates a washer with three nozzle sets A, B, C that are supplied from the tank 102 in the upper area, and three additional nozzles D, E, F, in the area 103, that is supplied with a wash liquid from the tank 104. The sump is numbered 105.

Chalk hydrate or limestone is preferred for the different pH adjustment and is added both to the tank for the upper nozzle plane and for the lower nozzle plane. However, the pH value above is kept at less than 4 and for the subsequent nozzles is preferably greater than 5.

Furthermore, according to the present invention it is proposed that the delay time in the subsequent washer sump is long enough that it is at least 10 minutes in order to bring the redox potential to greater than minus 100 millivolts.

Figure 9:
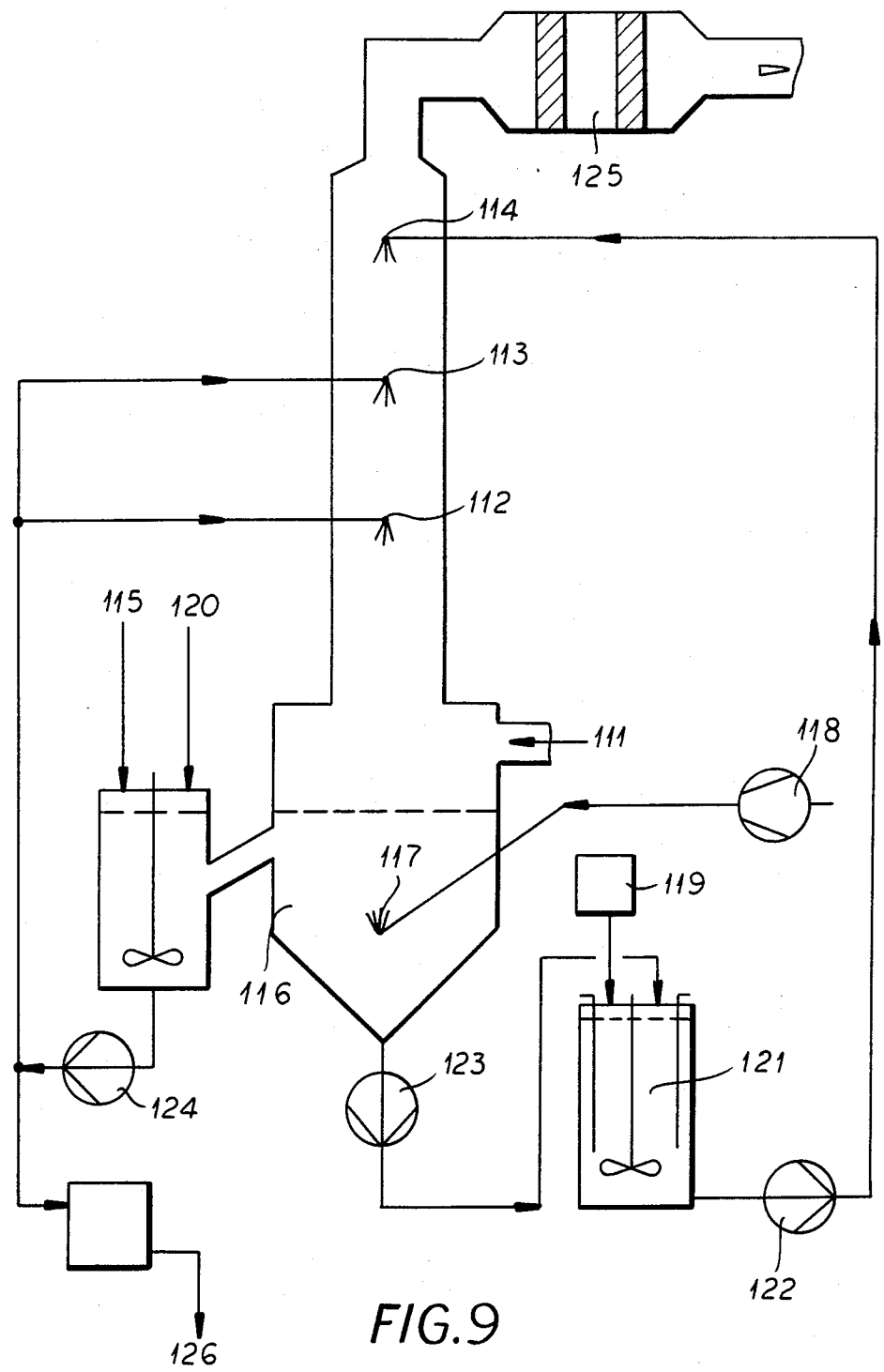
FIG. 9 is a schematic representation of an eighth version of the separation process.

In FIG. 9, 111 is the crude gas inlet, 112 and 113 are the nozzle planes I and II, 114 is nozzle plane III; 115 indicates the $CaCO_3$ dosing and mixing system for the wash water addition for the nozzle planes I and II with dissolved calcium carbonate or chalk hydrate. In place of $CaCO_3$ or chalk hydrate it is also possible to use alkaline liquors, for example, caustic soda, in the tank 115.

116 is the washer sump; 117 is the air injection nozzle that is supplied from a rotary piston blower, for example in the washer sump; 118 is the air blower; 119 is a tank with a supply of reducing agents, for example, dithionite; 120 is the supply of formic acid. 121 indicates a reduction tank with, for example, iron plates and similar or electrochemical reduction system (electrolysis); 122 indicates a pump for supplying the existing wash liquid with reducing agent and a negative reduction potential in the nozzle planes 114 that operate counter to the current of crude gas; 123 indicates the pump that delivers the wash water from the washer sump with a positive redox potential to the reduction tank 121; 124 is the pump that serves the nozzle planes II and III that supply the wash fluid, at a positive redox potential and enriched with limestone and/or chalk hydrate, in the circulation system. 125 is a demisting system that operates in the manner of a droplet separator and is incorporated after the washer, and 126 is the gypsum discharge.

This layout, according to the present invention, ensures that the $SO_2$ and the nitrous oxide can be separated from the smoke gas simultaneously with the formation of calcium sulfate and liberated nitrogen.

In a counter-flow washer the nozzles can be supplied with a wash liquid that consists of chalk hydrate and water, in which connection preferably carboxylic acid is used to improve the solubility of the additives, a wash liquid being sprayed into the last nozzle plane counter to the first nozzle plane, this wash liquid having a minus redox potential that is adjusted by the addition of reducing agent such as dithionite, or is passed through a reduction tank fitted with iron plates. In addition, the desired redox potential can be adjusted by electrochemical reduction (electrolysis), so that the wash liquid is passed to the nozzle plane 114, i.e., to the last nozzle plane in the exhaust flow zone of the washer.

At the same time, air is supplied to the washer, so that in the lower part of the washer sump $CaSO_3$ is oxidized to $CaSO_4$ and some of the wash water with a positive reduction potential is pumped through pump 123 to adjust to the negative reduction potential in the reduction system 121.

The gypsum discharge at 126 is provided by centrifuges and the like.

Figure 10:
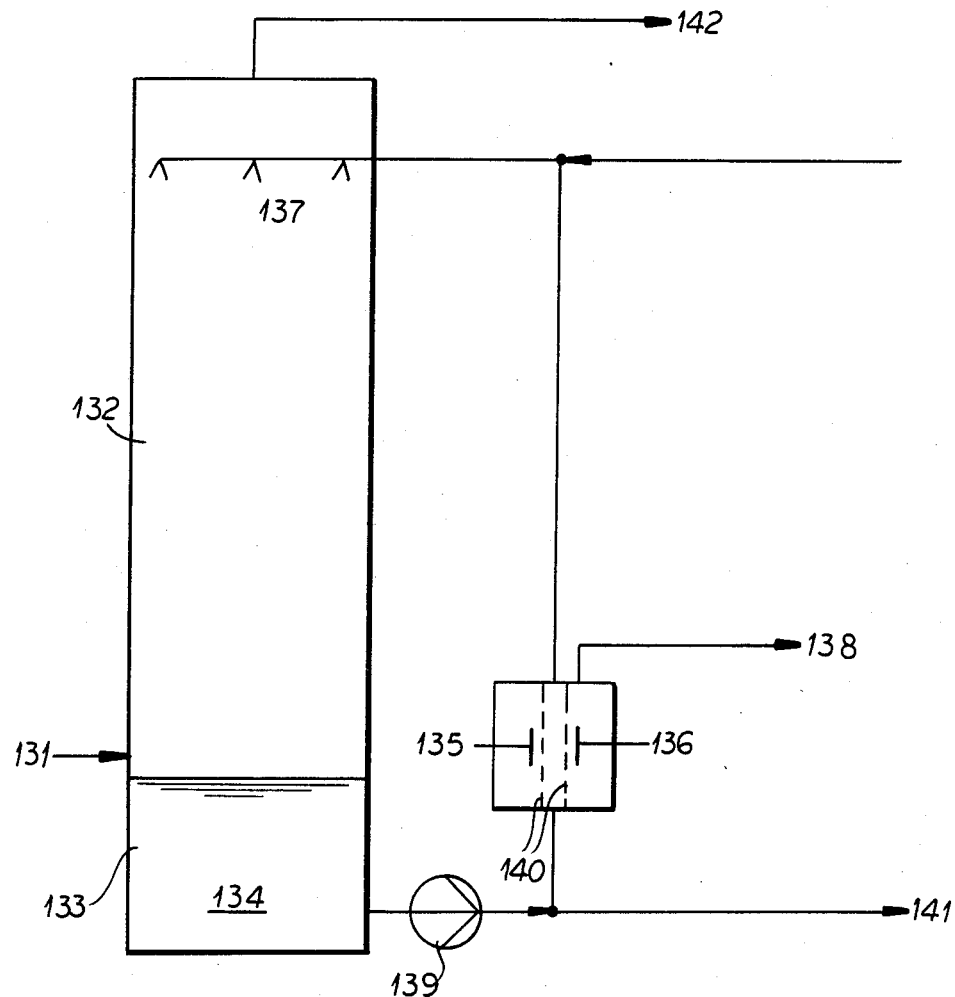
FIG. 10 is a schematic representation of a ninth version of the separation process.

In FIG. 10, 131 indicates the crude gas, 132 the washer, 133 the wash suspension, 134 the washer sump, and 135 the cathode. 136 indicates the anode with an electrochemical cell and membranes 140, 137 indicates the nozzles, 138 is the chlorine discharge, 139 a pump, and 140, 141 and 142 indicate the membranes, the sulfate separation and the pure gas, respectively.

Figure 11:
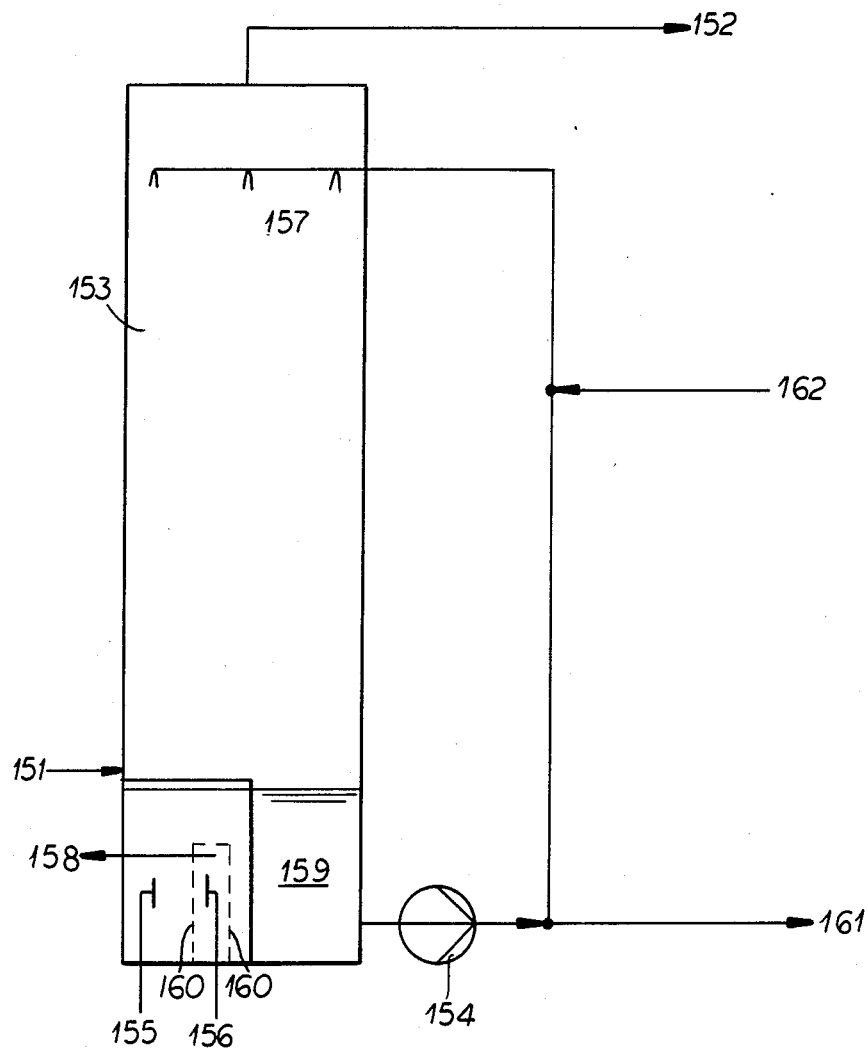
FIG. 11 is a schematic representation of the separation process according to FIG. 10.

In FIG. 11, 151 indicates the crude gas, 152 the pure gas, and 153 the washer. 154 is the pump, 155 the cathode, and 156 the anode. The nozzles are numbered 157, the chlorine 158, the washer sump 159, while the membranes are at 160, the gypsum for filtration is at 161, and the fresh limestone suspension is 162.

In the versions according to FIG. 10 and FIG. 11, the crude gas 131, 151, which contains NO, $NO_2$, $SO_2$, $SO_3$, $H_2O$, $N_2$, $O_3$, CO, $CO_2$, and dust is fed to a washer, 132, 153 that processes it in counter-flow or straight-flow with a wash solution 153. In FIGS. 10 and 11, the examples shown are of counter-flow versions. The wash solution 153 contains bivalent iron that is present as hydrated ion, as sulfur complex, as chloride complex, and according to the complexing agent, for example, as EDTA or NTA complex. The bivalent iron serves in the known manner to bind the poorly soluble NO molecule complexly and transfer it to the aqueous phase.

According to the present invention, the trivalent iron that is also present in equilibrium is complexed with formic acid and thus prevented from precipitating out as iron-III hydroxide; it is because of this that the electrochemical process is stable.

In the pH ranges of 3-6 and redox potential from $-150$ mV to 250 mV compared with the normal hydrogen electrodes, less than 20% of the total iron is present as trivalent iron.

In order to separate the sulfates that result from oxidization cations, predominantly calcium ions, are added in the known manner to the wash solution.

Wash suspension 133 is drawn from the washer sump 134 through a pump 139 and passed to the gypsum filtration stage (sulfate separation 136, 156).

Part of the current enters an electrochemical cell, in which complexly bonded NO is converted on the cathode 135, 155 to become nitrogen and water. In addition, trivalent iron is reduced to bivalent iron on the cathode 135, 155, dissolved transition metals such as $Cu^{++}$ and $Cd^{2+}$ are separated cathodically, and hydrogen sulfite is converted to dithionate.

Chlorine gas is formed on the anode 136, 156 and this is drawn off in known manner from the anode space that is provided with semi-permeable membranes 140, 160, dried, and then compressed.

By means of suitable process management it is possible to arrive at a waste-water free method of operation, since the chloride ions that normally demand removal are removed in the form of chlorine gas.

The nitrite ions and the nitrate ions that are formed from $NO_2$ in the smoke-gas wash can be removed from the main stream, preferably through anion exchange membranes. Nitrate is easily oxidized into nitrate and extracted as nitric acid.

Use is not limited to power-generating stations; the reduction of exhaust gas content can be achieved in heating plants, various industrial firing plants, as well as in mobile facilities such as mobile electrical generators, ships, diesel locomotives, and motor vehicles.

Figure 12:
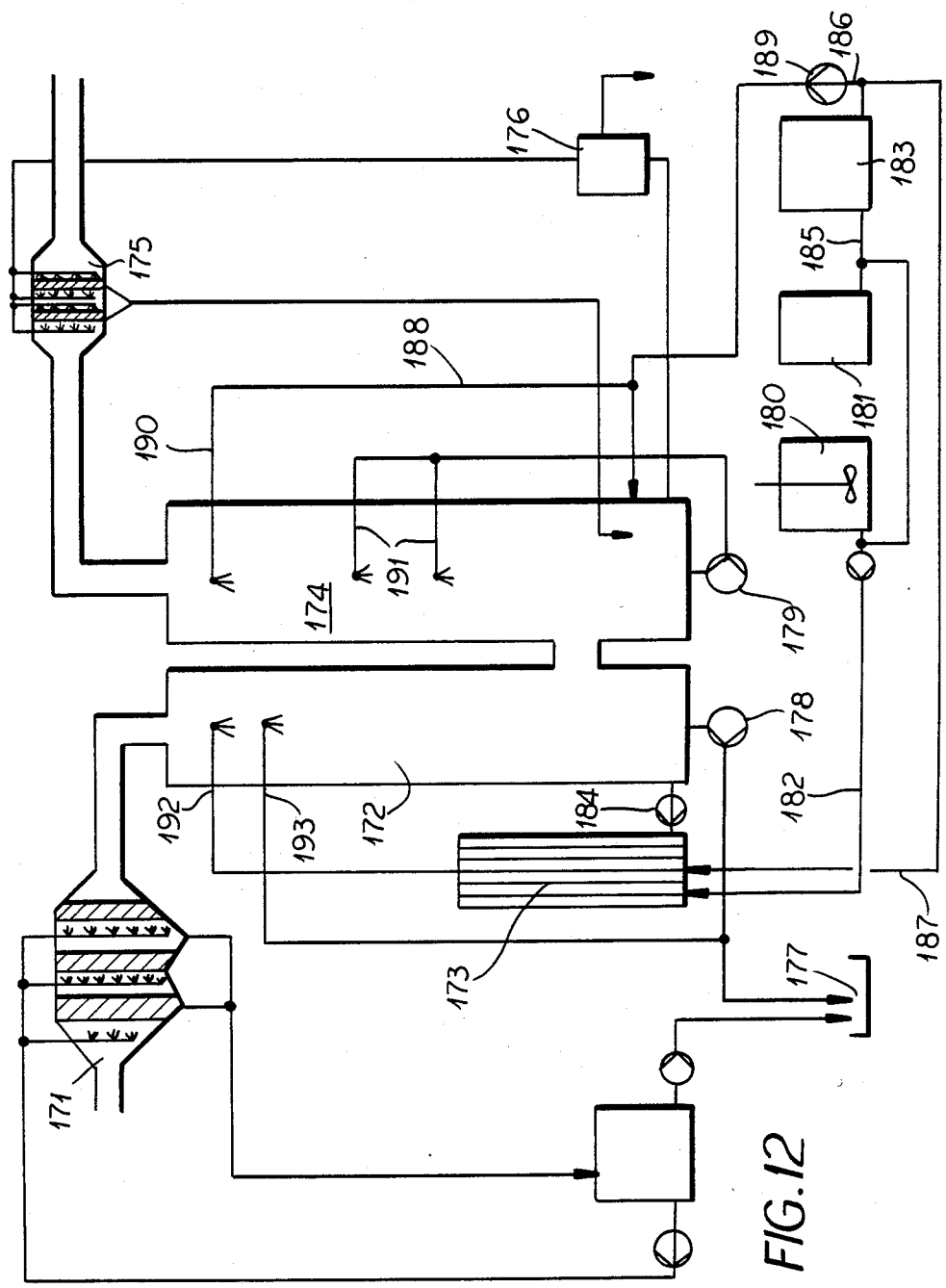
FIG. 12 is a schematic representation of a tenth version of the separation process.

In FIG. 12, 171 indicates the so-called pre-washer that serves to separate chlorine when coal that contains chlorine is burned; 172 is the wash stage that is operated as acidic, preferably in the range between pH 3 and pH 4; 173 indicates an iron reactor over which the liquid from the acid wash circulation stage is supplied; 174 is the second wash stage, that is preferably alkaline, i.e., at a somewhat higher pH of greater than 5 than the first wash stage, numbered 172. 175 is a droplet separator behind the second wash stage 174 and 176 is a decanter that cleanses part of the wash liquid from the second wash circulation stage 174 in order to pass it to the droplet separator for rinsing. 177 is the wash-liquid supply to the gypsum dehydration stage (centrifuge or belt-type filter), 178 is a circulation pump for the wash circulation stage 172 and 197 is the wash-liquid pump for the washer 174, the second wash stage for the circulation stage at a pH value of greater than pH 5, some being passed to the decanter 176 in order that the solid (gypsum) can be removed. 180 is the limestone or chalk hydrate mixing container, 181 is the tank for sodium dithionite, ascorbic acid or an equivalent reducing agent. 182 is the sodium dithionite or ascorbic acid supply, or the supply of an equivalent reducing agent that is added to the wash liquid ahead of the iron reactor 173, in which connection this supply is only for the delivery phase, up to the point that the reactor 173 maintains the prescribed redox potential without reducing agent.

Subsequently, a portion of the (output from the) pump 179 is passed to the area of the pump 184.

185 indicates the quantity of wash liquid.

Some of the wash liquid from the limestone mixing container 180 is passed to an electrolysis station 183.

A wash liquid 186 processed with a suitable negative redox potential is supplied from the electrolysis station 183 into the area of the iron reactor 173, along the line numbered 187, and/or into the area, numbered 188, of the counter-flow washer 174.

It is possible that some of the liquid from the tank 181, which is filled with reducing agent, can be moved to the electrolysis station 183 so that—because of the reducing agent and electrolysis—a very rapid reaction gan be ensured to adjust the reduction potential, and the concentrated negative redox potential can be supplied, through a further pump 189, in the wash liquid of the nozzle plane 190.

This nozzle plane is the last in the wash system, in order to attach the as-yet unseparated $NO_x$ and $SO_2$ to the wash liquid, in order to move it to the nozzle plane 191 below and liberate elementary nitrogen $N_2$ here.

The arrangement according to the present invention, described above, ensures the greatest possible simultaneous separation of $SO_2$ and $NO_x$.

The nozzle plane in the straight-flow washer is numbered 192, and the subsequent nozzle plane is numbered 193.

We claim:

1. A process for stripping nitrogen and sulfur oxides from a fossil-fuel combustion gas, comprising the steps of:
   (a) scrubbing said combustion gas in at least one scrubbing stage with an aqueous scrubbing liquid;
   (b) adding to said scrubbing liquid ethylenediaminetetraacetic acid to chelate iron, at least one other carboxylic acid, and at least one further substance selected from the group which consists of lime, limestone, fine white chalk, hydrated lime, phosphonic acid and phosphonic acid salts whereby a chelated iron nitrogen oxide complex is formed in said liquid; and
   (c) reducing nitrogen oxides absorbed in said liquid and in the form of said chelated iron nitrogen oxide complex to elemental nitrogen by the steps of:
      ($c_1$) adding a reducing agent consisting at least of sodium dithionite to said aqueous scrubbing liquid, and
      ($c_2$) potentiometrically reducing said chelated iron nitrogen oxide complex to elemental nitrogen and water between an anode and a cathode in contact with said liquid.

2. The process defined in claim 1 wherein phosphonic acid or a phosphonic acid salt is added to said scrubbing liquid in step (b) in addition to said ethylenediaminetetraacetic acid.

3. The process defined in claim 1 wherein scrubbing of said combustion gas is effected in two stages including a first stage with said scrubbing liquid to which said ethylenediaminetetraacetic acid is added in step (b) at a pH of 2.5 to 4.5, hydrochloric acid being added to said liquid in said first stage, a second scrubbing stage being effected for the desulfurization of said combustion gas.

4. The process defined in claim 1 wherein said combustion gas is scrubbed in a plurality of stages including a first hydrochloric acid scrubbing stage, a second stage in which said combustion gas is scrubbed in accordance with steps (a) and (b), and a third stage for desulfurization of said combustion gas.

5. The process defined in claim 1, further comprising the step of recovering ethylenediaminetetraacetic acid from said scrubbing liquid by reducing the pH thereof to substantially 2.0.

6. The process defined in claim 1, further comprising the step of complexing the ethylenediaminetetraacetic acid added in step (b) to said scrubbing liquid with iron-II sulfate before the ethylenediaminetetraacetic acid is added to said scrubbing liquid.

7. The process defined in claim 6, which further comprises the step of acidifying said scrubbing liquid with sulfuric acid, simultaneously with the addition of iron-II sulfate thereto.

8. The process defined in claim 6, further comprising the step of raising the pH of said scrubbing liquid by adding thereto an alkali simultaneously with the addition of iron-II sulfate.

9. The process defined in claim 6, further comprising the step of adding to the scrubbing liquid in step (b) at least one phosphonic acid complex with iron-II.

10. The process defined in claim 1 in which nitrogen oxides are reduced in step (c) at least in part by adding to said scrubbing liquid an alkali or alkaline earth bisulfite produced in a prior scrubbing stage of said combustion gas.

11. The process defined in claim 1 wherein in step (c) said reducing agent includes ascorbic acid.

12. The process defined in claim 1 wherein nitrilotriacetic acid is added to said scrubbing liquid.

13. The process defined in claim 1 wherein in step (c) metallic iron is added to said aqueous scrubbing liquid at a pH less than 6.

14. The process defined in claim 13 wherein iron and sodium dithionite are added in separate steps to the scrubbing liquid in step (c).

15. The process defined in claim 1 wherein said sodium dithionite is formed electrochemically in situ within said aqueous scrubbing liquid.

16. The process defined in claim 1 wherein in step ($c_2$) chlorine is formed on said anode and is removed, metal separation occurs on said cathode from which the separated metals are removed, and the anode is provided in an anode cell isolated by a membrane and in which the nitrate ion enrichment occurs.

17. The process defined in claim 16 wherein said membrae is an anion exchanger material, said anode is titanium and said cathode is carbon.

18. The process defined in claim 16 wherein oxidizing gases formed on said anode are used to oxidize sulfite to sulfate in the scrubbing of said combustion gas.

19. A process for stripping nitrogen and sulfur oxides from a fossil-fuel combustion gas, comprising the steps of:
(a) scrubbing said combustion gas in at least one scrubbing stage with an aqueous scrubbing liquid;
(b) adding to said scrubbing liquid ethylenediaminetetraacetic acid to chelate iron, at least one other carboxylic acid, and at least one further substance selected from the group which consists of lime, limestone, fine white chalk, hydrated lime, phosphonic acid and phosphonic acid salts whereby a chelated iron nitrogen oxide complex is formed in said liquid; and
(c) reducing nitrogen oxides absorbed in said liquid and in the form of said chelated iron nitrogen oxide complex to elemental nitrogen by potentiometrically reducing said chelated iron nitrogen oxide complex to elemental nitrogen and water between an anode and a cathode in contact with said liquid.

* * * * *